United States Patent
Walser et al.

(10) Patent No.: US 7,470,049 B2
(45) Date of Patent: *Dec. 30, 2008

(54) VEHICLE LAMP ASSEMBLY WITH HEAT SINK

(75) Inventors: Jeremy A. Walser, Holland, MI (US); Kenton J. Ypma, Hudsonville, MI (US); Daniel J. Bostwick, Grandville, MI (US); John K. Roberts, East Grand Rapids, MI (US); Robert Steel, Coventry (GB); Steven J. Miskelley, Holland, MI (US); Darin D. Tuttle, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/738,556

(22) Filed: Apr. 23, 2007

(65) Prior Publication Data

US 2007/0285937 A1    Dec. 13, 2007

Related U.S. Application Data

(63) Continuation of application No. 10/953,329, filed on Sep. 29, 2004, now Pat. No. 7,207,702, which is a continuation of application No. 10/230,804, filed on Aug. 29, 2002, now Pat. No. 6,805,474.

(60) Provisional application No. 60/324,551, filed on Sep. 25, 2001, provisional application No. 60/316,600, filed on Aug. 31, 2001.

(51) Int. Cl.
*B60Q 1/26* (2006.01)

(52) U.S. Cl. .................. 362/494; 362/545; 362/547
(58) Field of Classification Search ................. 362/494, 362/240, 294, 373, 545–547, 800
See application file for complete search history.

(56) References Cited

U.S. PATENT DOCUMENTS

| 4,105,301 A | * | 8/1978 | Doeg .................. 359/877 |
| 4,267,559 A | | 5/1981 | Johnson et al. |
| 4,338,717 A | | 7/1982 | Damon |
| 4,729,076 A | | 3/1988 | Masami et al. |

(Continued)

FOREIGN PATENT DOCUMENTS

EP    0303741 A1    2/1989

(Continued)

OTHER PUBLICATIONS

"SnapLED 70 LEDs," Technical Data, Hewlett Packard, 1999.

(Continued)

*Primary Examiner*—Hargobind S Sawhney
(74) *Attorney, Agent, or Firm*—Price, Heneveld, Cooper, DeWitt & Litton, LLP

(57) ABSTRACT

An apparatus including at least one LED mounted to a printed circuit board, a reflector including at least one heat stake, and a mounting plate comprising at least one aperture for receiving the at least one heat stake. The at least one LED is positioned between the reflector and the mounting plate such that the at least one LED is held in position when the at least one heat stake is received within the at least one aperture.

11 Claims, 13 Drawing Sheets

U.S. PATENT DOCUMENTS

| | | | |
|---|---|---|---|
| 4,733,335 A | | 3/1988 | Serizawa et al. |
| 4,733,336 A | * | 3/1988 | Skogler et al. ............... 362/142 |
| 4,911,519 A | | 3/1990 | Burton et al. |
| 5,032,898 A | | 7/1991 | Bowen et al. |
| 5,291,039 A | | 3/1994 | Ogata et al. |
| 5,388,035 A | | 2/1995 | Bodem, Jr. |
| 5,481,409 A | * | 1/1996 | Roberts ..................... 359/839 |
| 5,490,049 A | | 2/1996 | Montalan et al. |
| 5,576,687 A | * | 11/1996 | Blank et al. ................. 340/438 |
| 5,783,909 A | | 7/1998 | Hochstein |
| 5,785,418 A | | 7/1998 | Hochstein |
| 5,803,579 A | | 9/1998 | Turnbull et al. |
| 5,823,654 A | * | 10/1998 | Pastrick et al. .............. 362/494 |
| 5,857,767 A | | 1/1999 | Hochstein |
| 5,865,530 A | | 2/1999 | Weber |
| 5,895,115 A | | 4/1999 | Parker et al. |
| 6,045,240 A | | 4/2000 | Hochstein |
| 6,045,243 A | * | 4/2000 | Muth et al. ................. 362/494 |
| 6,124,886 A | | 9/2000 | DeLine et al. |
| 6,132,072 A | | 10/2000 | Turnbull et al. |
| 6,149,287 A | | 11/2000 | Pastrick et al. |
| 6,158,867 A | | 12/2000 | Parker et al. |
| 6,170,956 B1 | | 1/2001 | Rumsey et al. |
| 6,264,353 B1 | * | 7/2001 | Caraher et al. .............. 362/494 |
| 6,329,925 B1 | | 12/2001 | Skiver et al. |
| 6,331,066 B1 | | 12/2001 | Desmond et al. |
| 6,335,548 B1 | | 1/2002 | Roberts et al. |
| 6,356,376 B1 | | 3/2002 | Tonar et al. |
| 6,367,940 B1 | | 4/2002 | Parker et al. |
| 6,367,949 B1 | | 4/2002 | Pederson |
| 6,428,189 B1 | | 8/2002 | Hochstein |
| 6,441,943 B1 | | 8/2002 | Roberts et al. |
| 6,494,602 B2 | | 12/2002 | Pastrick et al. |
| 6,498,440 B2 | | 12/2002 | Stam et al. |
| 6,508,563 B2 | | 1/2003 | Parker et al. |
| 6,509,832 B1 | | 1/2003 | Bauer et al. |
| 6,517,218 B2 | | 2/2003 | Hochstein |
| 6,520,667 B1 | | 2/2003 | Mousseau |
| 6,521,916 B2 | | 2/2003 | Roberts et al. |
| 6,523,976 B1 | | 2/2003 | Turnbull et al. |
| 2002/0149312 A1 | | 10/2002 | Roberts et al. |
| 2002/0159270 A1 | | 10/2002 | Lynam et al. |
| 2002/0171954 A1 | | 11/2002 | Bonardi et al. |
| 2003/0043586 A1 | | 3/2003 | Sagal et al. |

FOREIGN PATENT DOCUMENTS

| | | |
|---|---|---|
| EP | 0 267 848 B1 | 6/1991 |
| EP | 0861754 B1 | 9/1998 |
| EP | 0972677 A2 | 1/2000 |

OTHER PUBLICATIONS

"Super Flux LEDs," Technical Data, Hewlett Packard, 1998.

"High Output Blue, Green, and Red LED Illuminators," New Products, Opto Technology, Inc., 1998.

"Differences Between the SnapLED 150 and Super Flux/SnapLED Products," Application Note 1177, Hewlett Packard, 1999.

"Very High Power IR Illuminator," OTL880B-9-4-66-E, Opto Technology, Inc., 1998.

"High Power Red Illuminator," OTL680A-9-4-66-E, Opto Technology, Inc., 1998.

"High Power White Illuminator," Preliminary, OTLWHTA-9-4-66-E, Opto Technology, Inc., 1999.

\* cited by examiner

FIG. 7
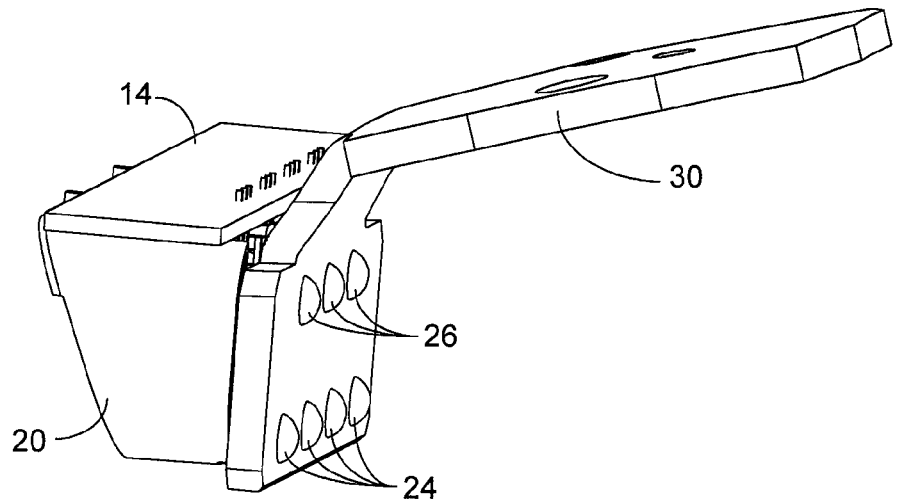
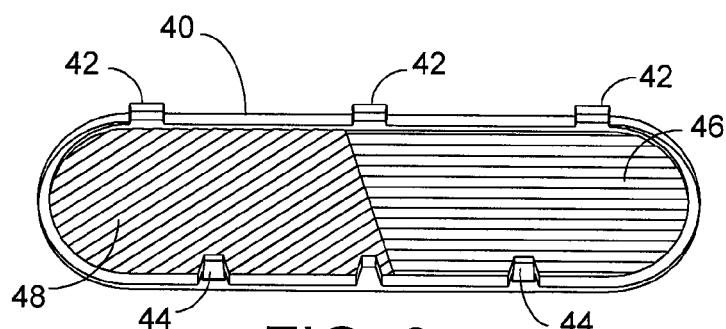
FIG. 8
FIG. 9
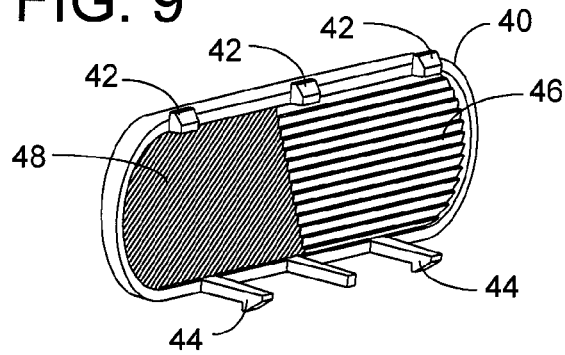

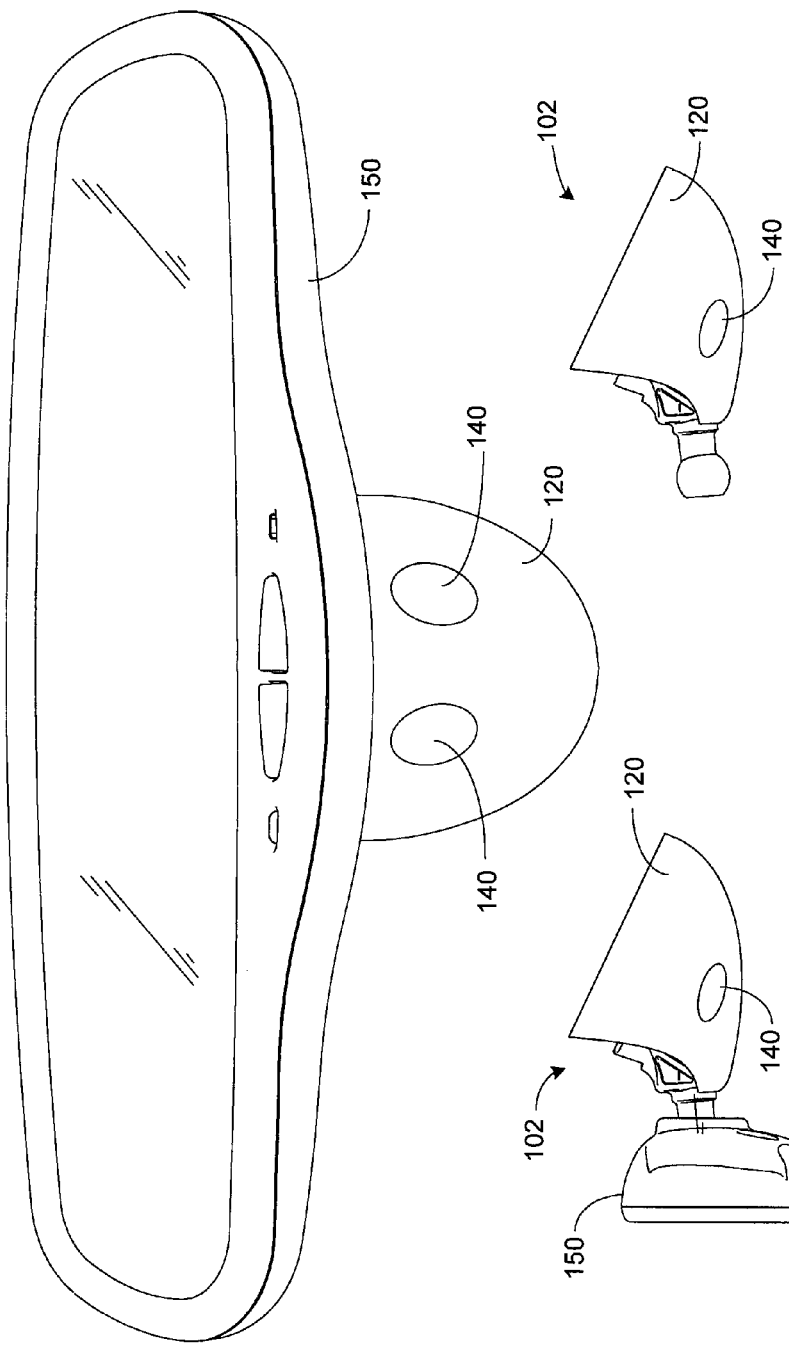

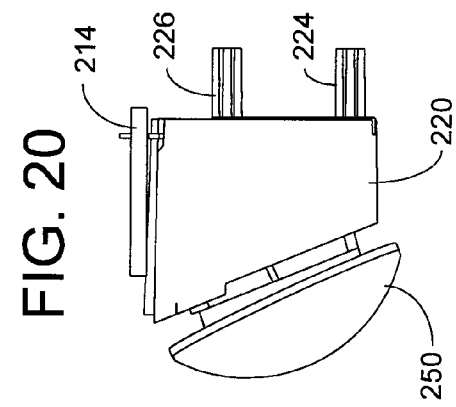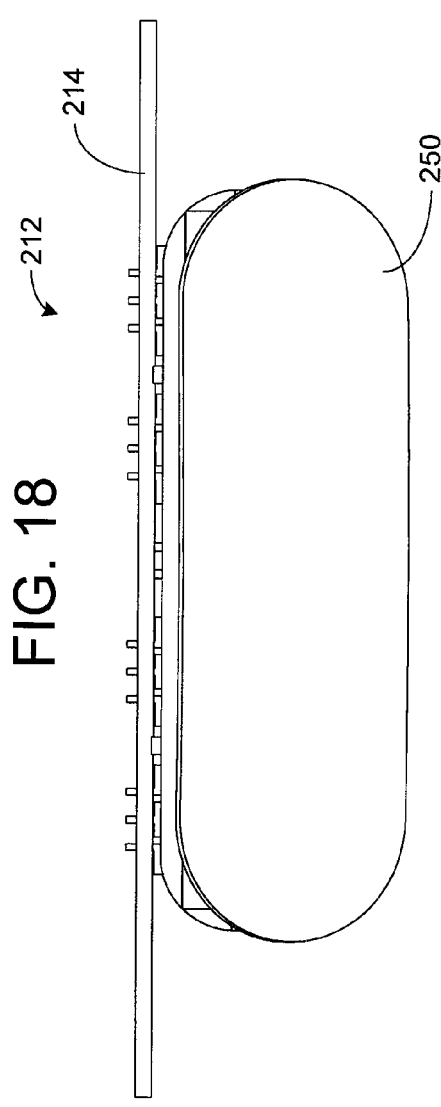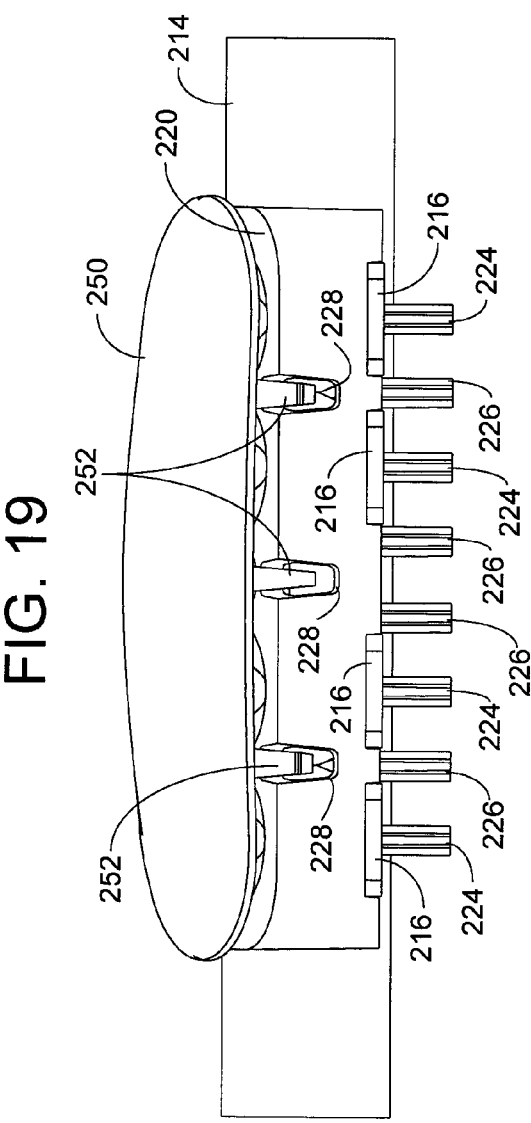

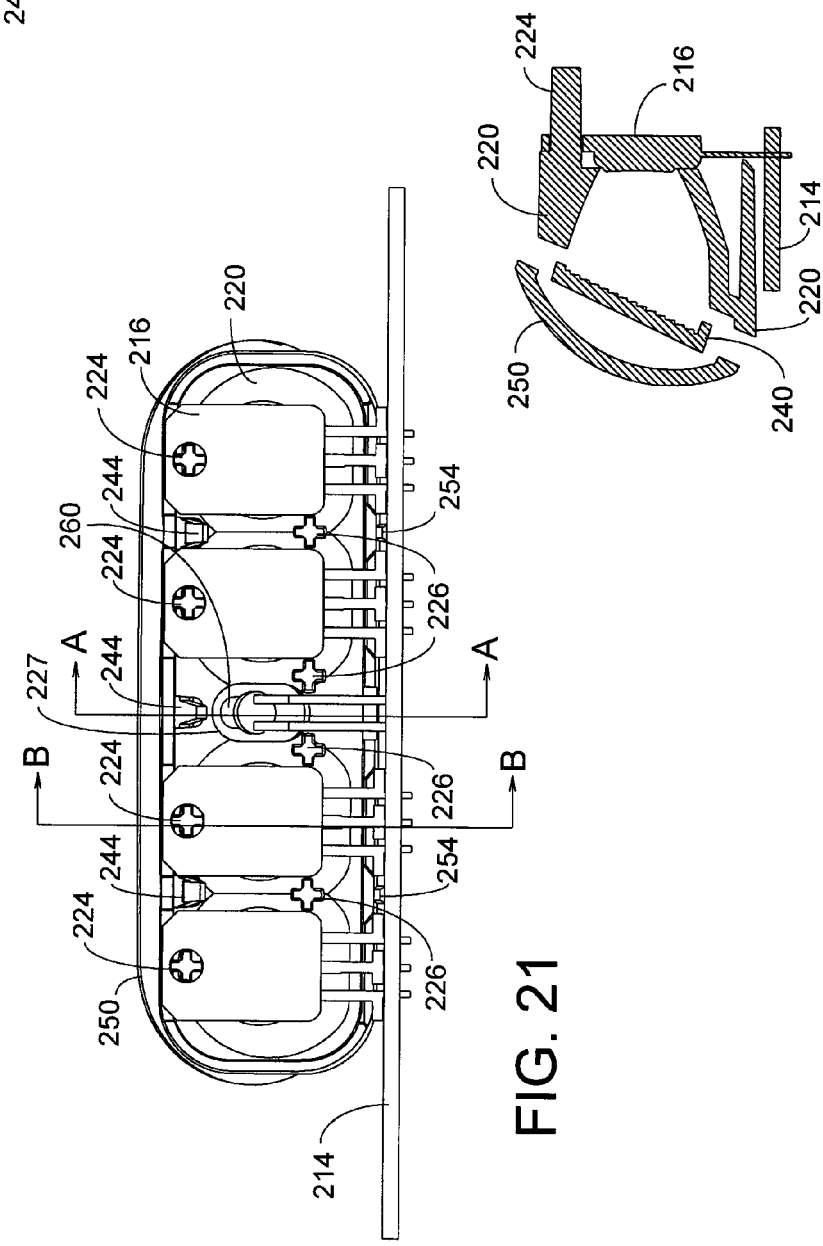

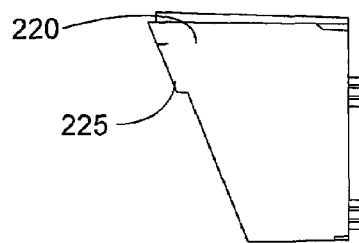
FIG. 28
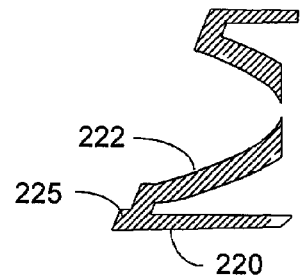
FIG. 31
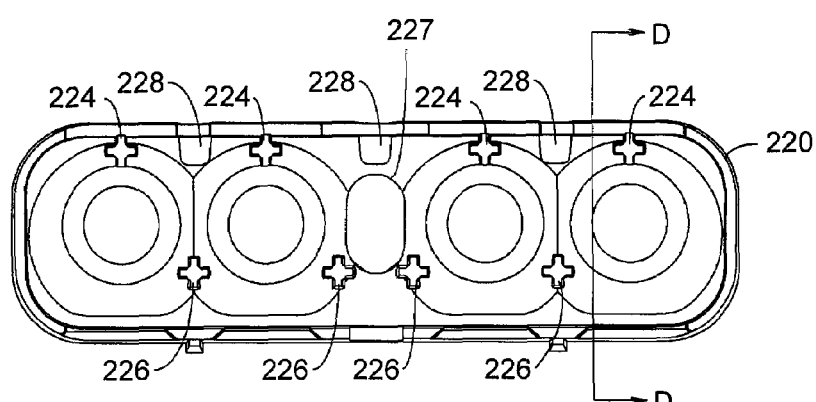
FIG. 29
FIG. 30
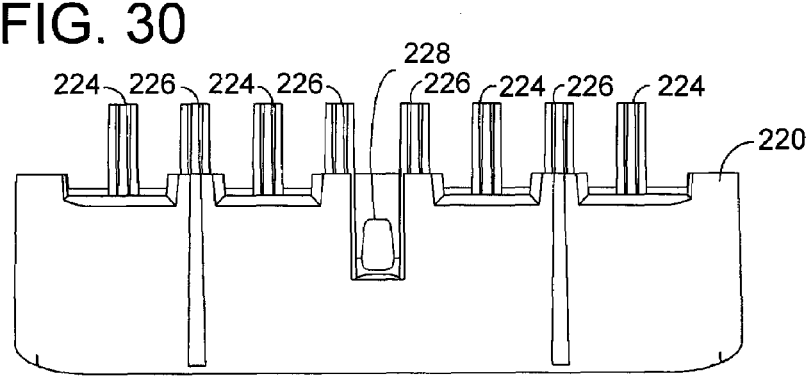

FIG. 32
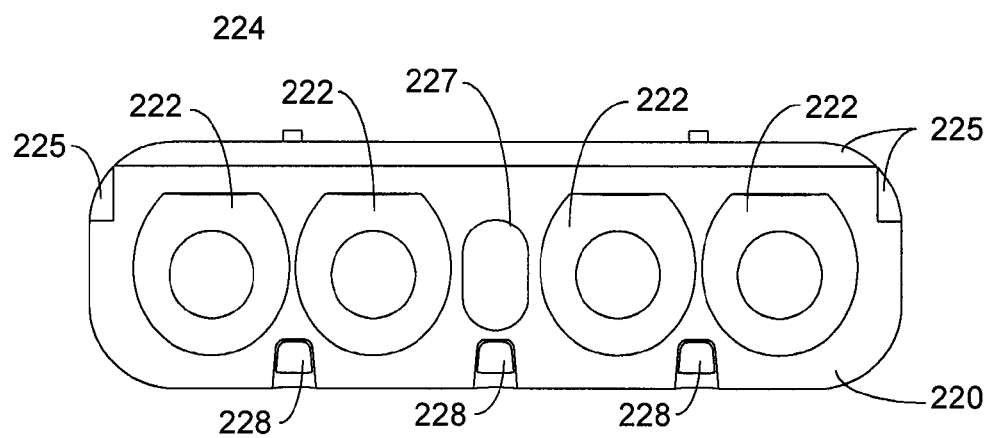
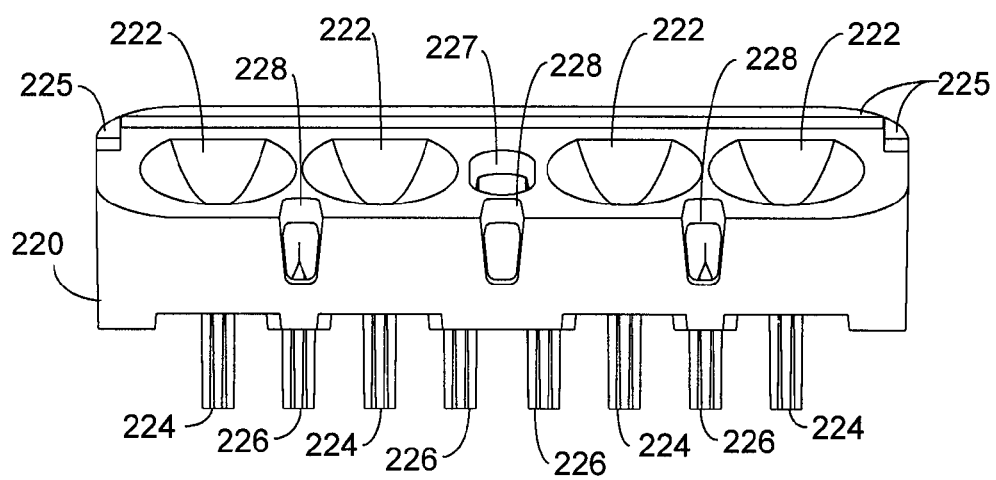
FIG. 33

US 7,470,049 B2

VEHICLE LAMP ASSEMBLY WITH HEAT SINK

CROSS-REFERENCE TO RELATED APPLICATIONS

This application is a continuation of U.S. patent application Ser. No. 10/953,329, filed on Sep. 29, 2004, now U.S. Pat. No. 7,207,702, which is a continuation of U.S. patent application Ser. No. 10/230,804, filed on Aug. 29, 2002, now U.S. Pat. No. 6,805,474, which claims priority under 35 U.S.C. §119(e) to the following: U.S. Patent Provisional Application No. 60/324,551, entitled "VEHICLE LAMP ASSEMBLY WITH HEAT SINK," filed on Sep. 25, 2001, by Jeremy A. Walser et al.; and U.S. Patent Provisional Application No. 60/316,600, entitled "VEHICLE LAMP ASSEMBLY WITH HEAT SINK," filed on Aug. 31, 2001, by Jeremy A. Walser et al. The disclosures of each of the above-referenced applications are incorporated herein in their entirety.

BACKGROUND OF THE INVENTION

The present invention generally relates to vehicle lamp assemblies, and more particularly relates to map lamp assemblies for implementation in rearview mirror assemblies.

Recently, with the advent of light emitting diodes (LED) illuminator assemblies capable of emitting white light, LEDs have now been implemented in vehicle lamp assemblies. An example of a rearview mirror assembly incorporating LED map lamps is disclosed in commonly assigned U.S. Pat. No. 5,803,579. In one disclosed example, a plurality of blue-green and amber LEDs was used, which were grouped in two separate groups for emitting light onto the lap area of the driver and front passenger. While such a construction is highly effective and advantageous over assemblies incorporating incandescent bulbs, it is desirable to utilize LEDs having greater light output so as to reduce the component count and the associated cost required for construction of such a rearview mirror assembly, and/or increase the light output from the map lamp assemblies of the rearview mirror. One form of LED developed by the assignee is disclosed in U.S. Pat. Nos. 6,335,548 and 6,441,943. As disclosed in U.S. Pat. No. 6,441,943, the LEDs disclosed in U.S. Pat. No. 6,335,548 may be placed in mirror assemblies and connected to heat sinks within those mirror assemblies.

While U.S. Pat. No. 6,441,943 discloses several useful concepts for attaching a heat sink to the LEDs used in a rearview mirror, other constructions are needed to allow for different rearview mirror designs that require different mounting techniques.

SUMMARY OF THE INVENTION

According to a first embodiment of the present invention, an apparatus comprises: at least one LED mounted to a printed circuit board; a reflector comprising at least one heat stake; and a mounting plate comprising at least one aperture for receiving the at least one heat stake, the at least one LED is positioned between the reflector and the mounting plate such that the at least one LED is held in position when the at least one heat stake is received within the at least one aperture.

According to another embodiment of the present invention, an apparatus comprises: a housing with a lamp assembly, the lamp assembly comprising at least one LED mounted to a printed circuit board; a reflector comprising at least one heat stake; and a mounting plate comprising at least one aperture for receiving the at least one heat stake, the at least one LED is positioned between the reflector and the mounting plate such that the at least one LED is held in position when the at least one heat stake is received within the at least one aperture.

According to another embodiment of the present invention, an apparatus comprises: at least one lamp comprising a heat extraction member having an aperture; and a mounting plate in contact with the heat extraction member; and a heat stake extending through the aperture in the heat extraction member to secure the lamp to the mounting plate.

According to another embodiment of the present invention, a process comprises the activities of: a) providing a LED subassembly, a reflector comprising at least one heat stake and a mounting plate with at least one aperture; b) positioning the LED assembly between the reflector and the mounting plate; and c) engaging the reflector with the mounting plate such that the at least one heat stake is received within the at least one aperture.

According to another embodiment of the present invention, an apparatus comprises: at least one first type LED comprising a heat extraction member, the first type LED mounted to a printed circuit board; a reflector comprising at least one heat stake; and a mounting plate comprising at least one aperture for receiving the at least one heat stake, the at least one first type LED is positioned between the reflector and the mounting plate such that the at least one first type LED is held in position when the at least one heat stake is received within the at least one aperture and the heat extraction member is in contact with the mounting plate.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 7 is a perspective view showing the top, front, and one side of the map lamp assembly after heat staking;

FIG. 8 is a perspective view showing the inside surface of a lens used with the map lamp assembly of the first embodiment of the present invention;

FIG. 9 is another perspective view showing the inside surface of the lens shown in FIG. 8;

FIG. 15 is a perspective view showing the front and bottom of the rearview mirror assembly of FIG. 13;

FIG. 16 is an elevational view of the side of the rearview mirror assembly of FIG. 13;

FIG. 17 is an elevational view of the side of a mounting structure used in the rearview mirror assembly of FIG. 13;

FIG. 18 is a plan view showing the bottom of the map lamp assembly of the third embodiment of the present invention;

FIG. 19 is an elevational view showing the back of the map lamp assembly of the third embodiment;

FIG. 20 is an elevational view showing the side of the map lamp assembly of the third embodiment;

FIG. 21 is a plan view showing the top of the map lamp assembly of the third embodiment;

FIG. 22 is a cross-sectional view taken along line A-A in FIG. 21;

FIG. 23 is a cross section taken along line B-B in FIG. 21;

FIG. 28 is an elevational view showing the side of the reflector used in the third embodiment;

FIG. 29 is a plan view showing the top of the reflector assembly shown in FIG. 28;

FIG. 30 is an elevational view showing the back of the reflector shown in FIGS. 28 and 29;

FIG. 31 is a cross section of the reflector shown in FIG. 29 taken along line D-D;

FIG. 32 is a plan view showing the bottom of the reflector shown in FIGS. 28-31; and FIG. 33 is an elevational view showing the front and top of the reflector shown in FIGS. 28-32.

DETAILED DESCRIPTION OF THE PREFERRED EMBODIMENTS

While the vehicle lamp assemblies are described below as functioning as map lamps provided on or within a rearview mirror assembly, it will be appreciated by those skilled in the art that this lamp assembly or certain aspects of the disclosed lamp assembly may be utilized in other lamp modules whether used in a vehicle or elsewhere. For example, the inventive lamp assemblies could be used in an overhead console, a windshield console, a sun visor, in a headliner, door panels, etc. of a vehicle.

Figure 1:
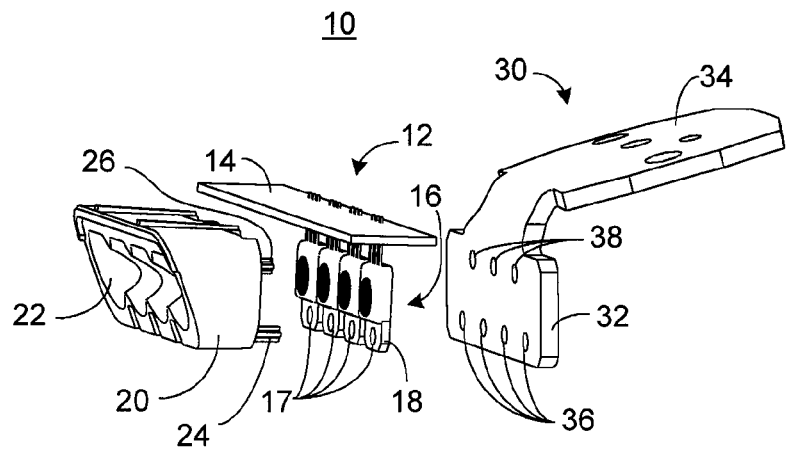
FIG. 1 is an exploded perspective view of a map lamp assembly constructed in accordance with a first embodiment of the present invention.
Figure 2:
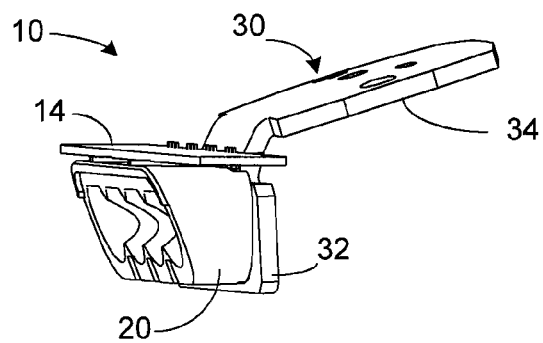
FIG. 2 is an assembled perspective view showing the bottom and one side of the map lamp assembly of the first embodiment.

As best shown in FIG. 1, a vehicle lamp assembly 10 constructed in accordance with a first embodiment includes an LED subassembly 12, which includes a printed circuit board 14 to which a plurality of LEDs 16 is electrically and physically connected. The LEDs are preferably physically secured to printed circuit board 14 such that their central optical axes along which they emit light are disposed substantially non-perpendicular to the surface of printed circuit board 14 to which the LEDs are mounted. The LEDs are preferably soldered to the circuit board using conventional techniques. LEDs 16 are preferably constructed with heat extraction members in accordance with the teachings of U.S. Pat. No. 6,335,548, the entire disclosure of which is incorporated herein by reference. These LEDs each also preferably include at least two LED chips including a chip that emits amber light and a chip that emits blue-green light such that the light emitted by these differently colored chips is simultaneously emitted from the LED and mixes to form effective white light. Methods and implementations for forming effective white light by mixing the light from two or more LEDs are disclosed in commonly assigned U.S. Pat. No. 5,803,579, the entire disclosure of which is incorporated herein by reference. The LEDs 16 also preferably include a lens integrally formed within the LED encapsulant. Preferably, the lens provided on each LED 16 is a microgroove or Fresnel lens as disclosed in U.S. Pat. No. 6,670,207, the entire disclosure of which is incorporated herein by reference.

Although not shown in the drawings, a connector plug is preferably provided at one end of printed circuit board 14 for connection to switches or another drive circuit for selective activation of LEDs 16. As will be discussed further below, of the four LEDs 16 that are shown in the drawings, two may be used to produce light that is projected onto the lap of the front passenger while the other two may be used to project light generally towards the driver's lap. Accordingly, these LEDs may be separately activated or may be activated simultaneously using a single switch or a combination of switches provided on the rearview mirror assembly or elsewhere in the vehicle.

Figure 4:
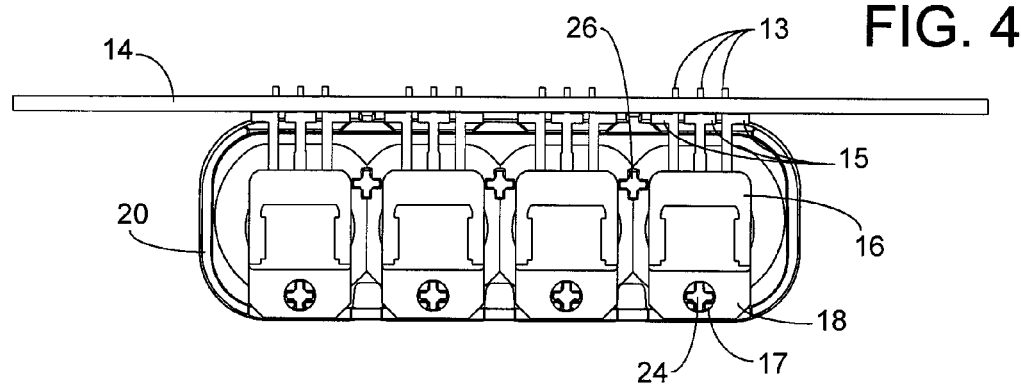
FIG. 4 is a plan view showing the top of the map lamp assembly with the mounting plate removed.

Lamp assembly 10 further includes a reflector 20, which includes a plurality of reflective cups 22 corresponding in number to the number of LEDs 16. Reflective cups 22 may have any conventional shape and are provided to direct as much light as possible that is emitted from LEDs 16 in a generally downward direction, as will be discussed further below. Reflector 20 may be formed of plastic and may have metalized surfaces to provide reflective cups 22. Reflector 20 also preferably includes a first set of heat stake pegs 24 and a second set of heat stake pegs 26 that extend upward from the top portion of reflector 20. As shown in the several drawings, the first set of heat stake pegs 24 is configured and aligned with apertures 17 formed in each of the heat extraction members 18 of LEDs 16. The second set of heat stake pegs 26 is positioned and aligned to extend between LEDs 16 as best shown in FIG. 4. The reflector may include slots on its upper edges such that the upper edges of LEDs 16, when attached to reflector 20, are flush with the upper edges of reflector 20. By providing and configuring heat stake pegs 24 and 26 to extend through and between LEDs 16, the central optical axes of the LEDs may be properly registered and aligned with the centers of the reflective cups. As best shown in FIG. 4, each of the LEDs 16 includes several leads 13 having standoffs 15 that ensure consistent insertion depth of the LEDs in the holes provided in circuit board 14. This, in turn, ensures that apertures 17 of each of LEDs 16 are located the same distance from circuit board 14 thereby aiding in the registration process.

Figure 5:
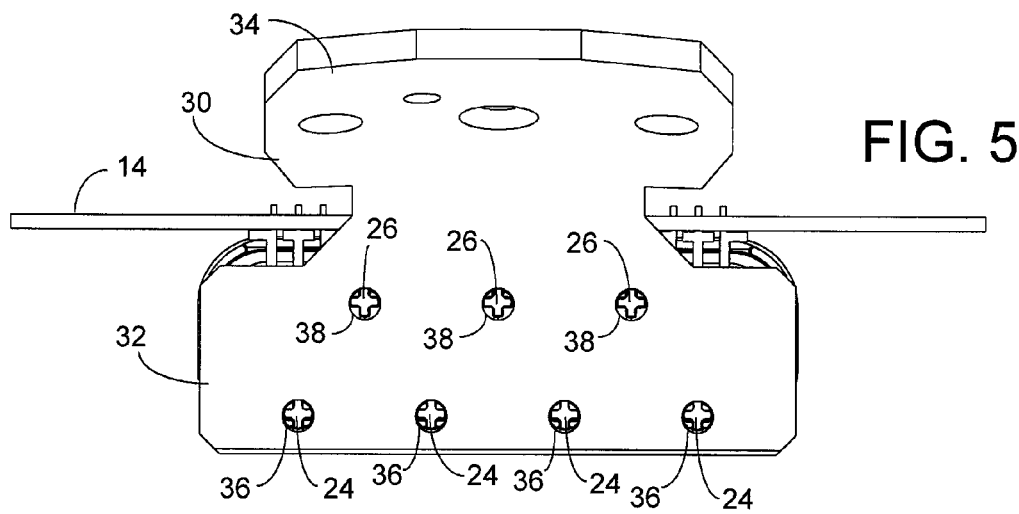
FIG. 5 is a top plan view of the map lamp assembly with the mounting plate engaging the heat stakes of the reflector.
Figure 6:
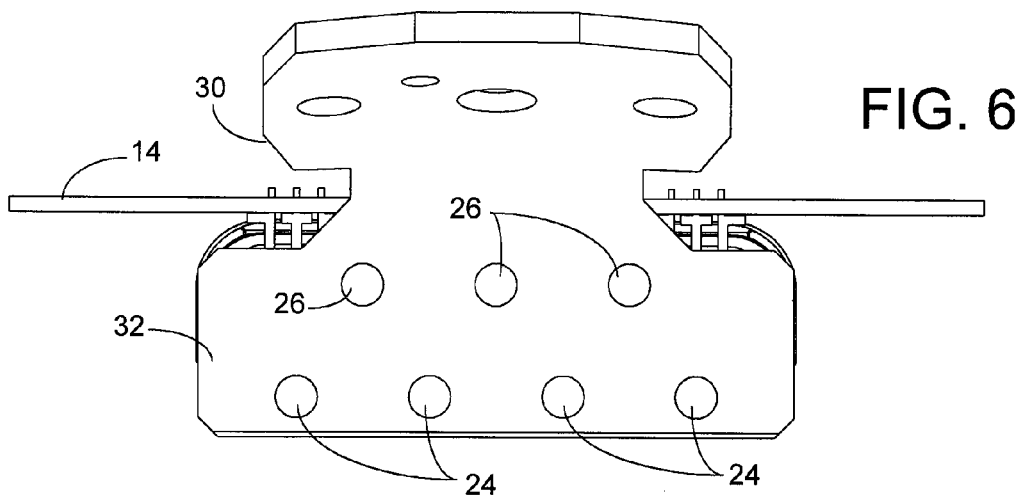
FIG. 6 is a top plan view showing the map lamp assembly after heat staking.
Figure 10:
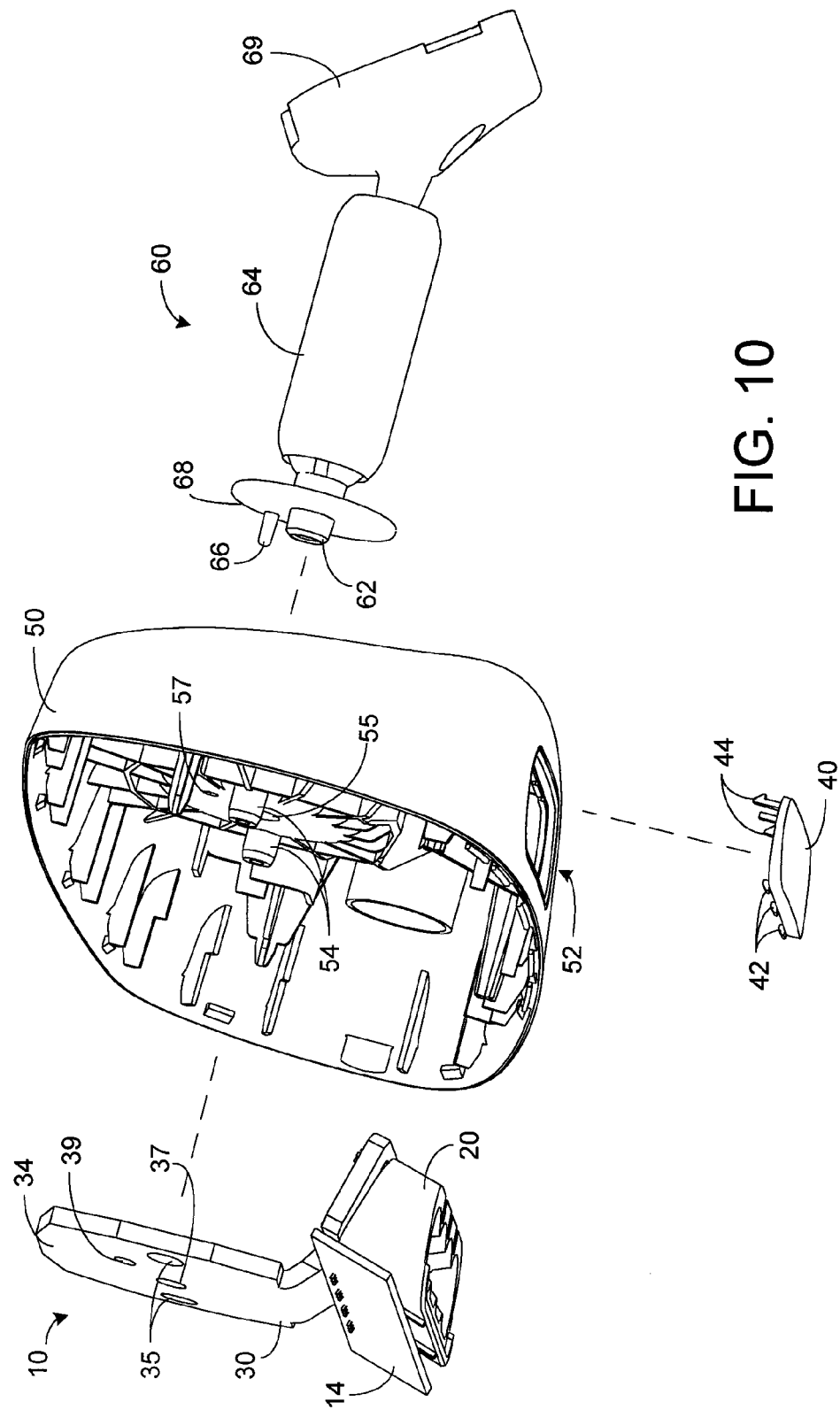
FIG. 10 is an exploded perspective view of a portion of a rearview mirror assembly in which the map light assembly and lens are mounted.
Figure 11:
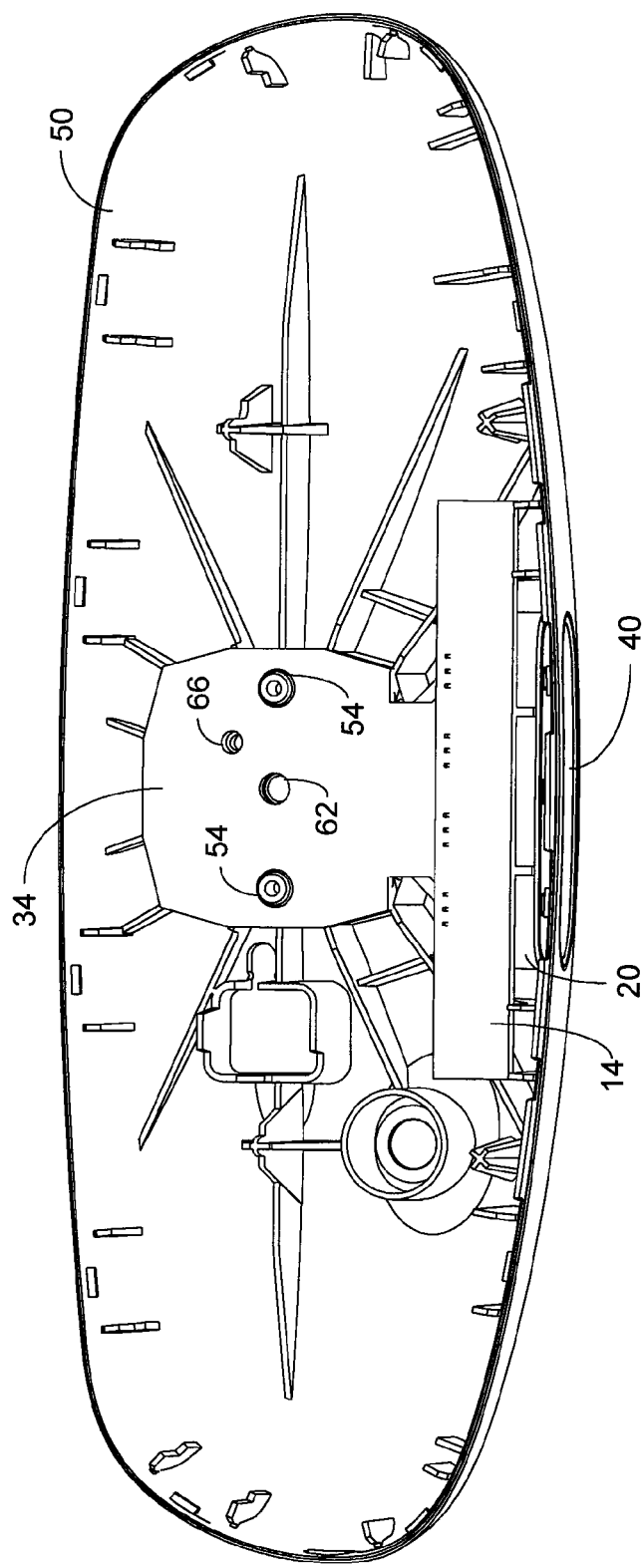
FIG. 11 is a front elevational view of the rearview mirror assembly in which the vehicle map lamp assembly of the first embodiment is mounted.

As shown in the drawings, lamp assembly 10 further includes a mounting plate 30 that is secured to the top of the lamp assembly and to the backs of LEDs 16. Preferably, mounting plate 30 is made of a material having a high thermal conductivity so as to not only function as a mounting plate, but also function as a heat sink for LEDs 16. As best shown in FIG. 1, mounting plate 30 includes a lamp mounting portion 32 and a mirror mounting portion 34, which are angled with respect to one another to ensure proper mounting within a mirror housing 50 (FIGS. 10 and 11). Lamp mounting portion 32 preferably includes a first set of apertures 36 corresponding in size and position to apertures 17 in LED 16 and the first set of heat stake pegs 24 of reflector 20. Lamp mounting portion 32 further includes a second set of apertures 38 that corresponds in position to the second set of heat stake pegs 26. Thus, mounting plate 30 may be slid onto heat stake pegs 24 and 26 as best shown in FIG. 5 and, subsequently, the heat stake pegs may be thermally deformed causing them to expand on their distal end, thereby securing mounting plate 30 to reflector 20 with LED subassembly 12 sandwiched in between.

As apparent from the drawing figures, mounting plate 30 is physically in contact with the backs of LEDs 16 and is in thermal contact with the heat extraction members 18 of LEDs 16 so as to provide a thermal path from the LEDs. Such heat sinking allows the LEDs to be driven at greater current levels to thereby emit more light. Preferably, mounting plate 30 is treated with a surface emissivity-enhancement (i.e., black-anodized, black-oxidized, black-sulphamate, black e-coated, etc.). As illustrated below, such treatment significantly lowers the operating temperature of the LEDs.

Figure 12:
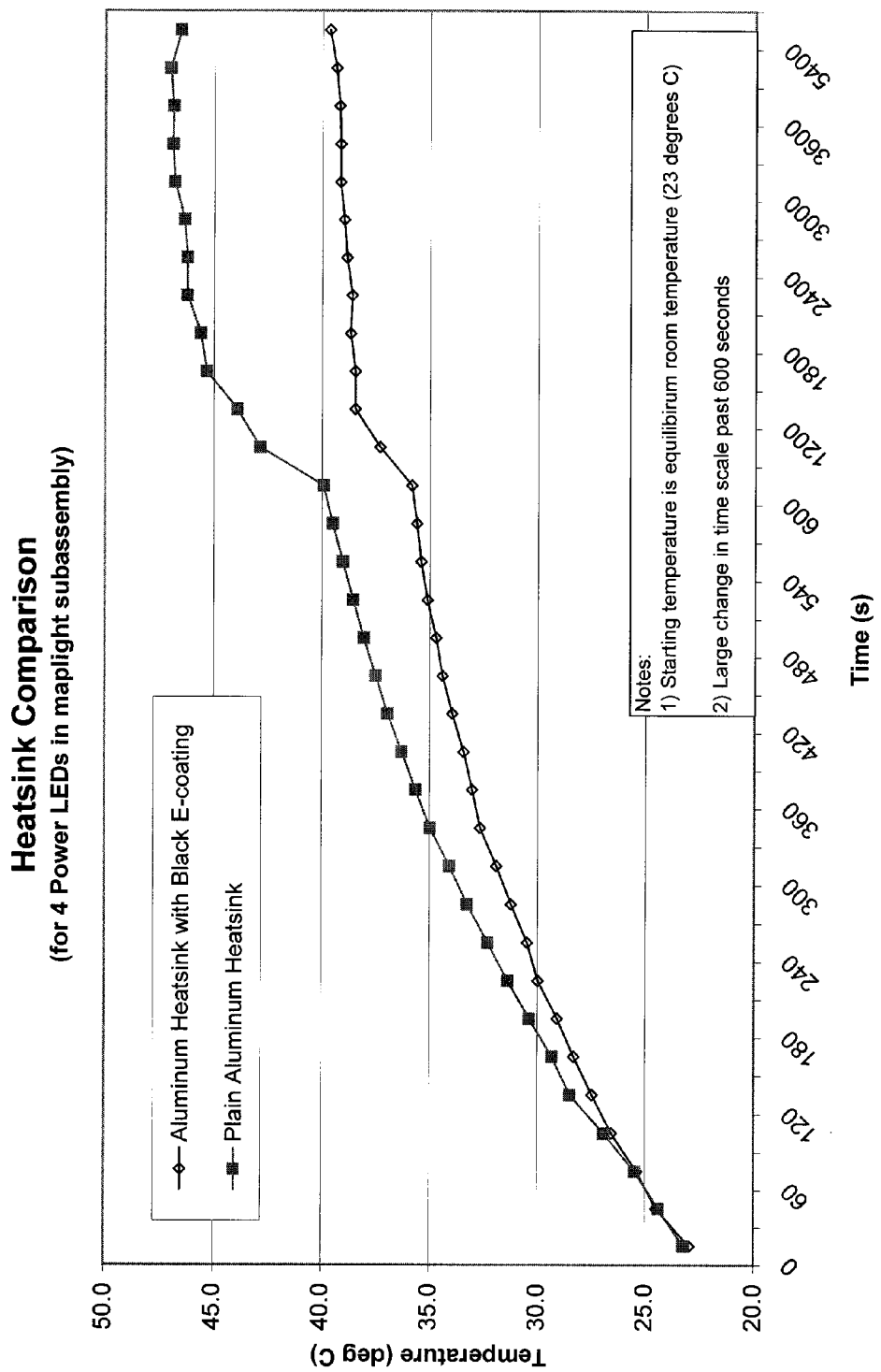
FIG. 12 is a comparative graph illustrating the temperature of the LEDs versus time when a non-coated washer/heat sink is utilized and when a black-anodized washer/heat sink is utilized.
Figure 13:
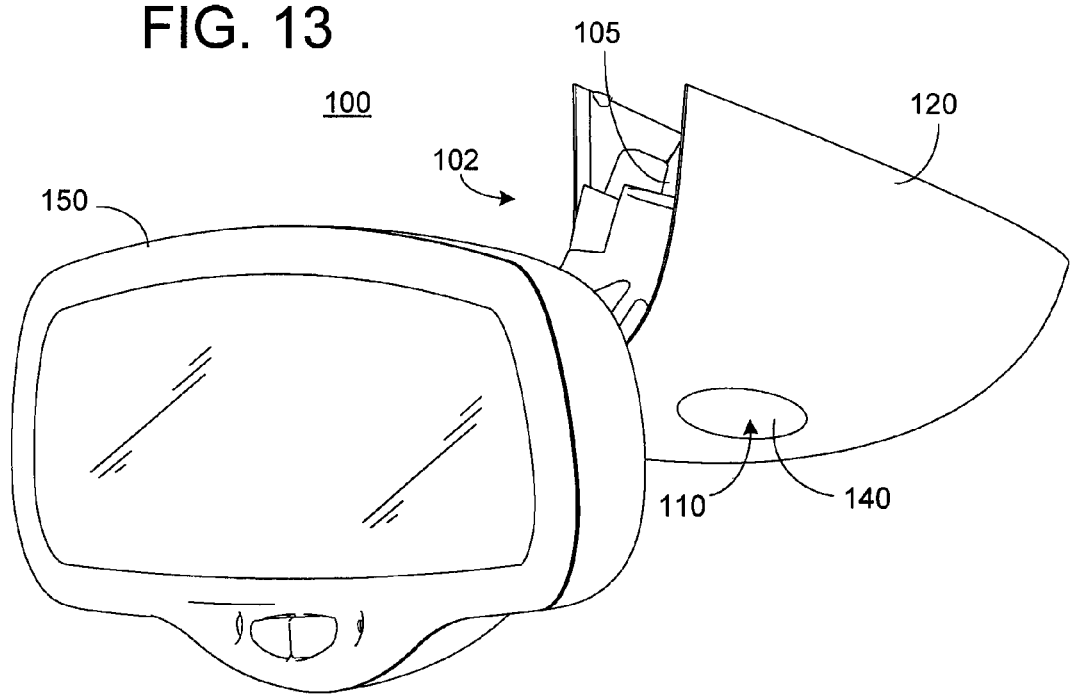
FIG. 13 is a perspective view showing the front and side of a rearview mirror assembly constructed in accordance with a second embodiment of the present invention.
Figure 14:
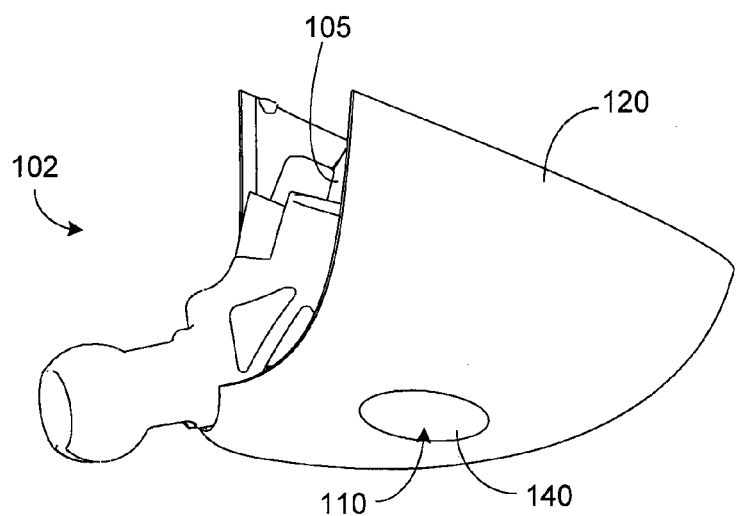
FIG. 14 is a perspective view showing the front and side of a mounting structure used in the rearview mirror assembly of FIG. 13.

To demonstrate the effectiveness of treating mounting plate 30 with a surface emissivity-enhancement, two LED assemblies were constructed similar in construction to that shown in FIG. 1. The two assemblies each included four high-power LEDs at 0.6 Watts apiece mounted to an aluminum heat sink/mounting plate using silicone RTV as a heat sink compound. The two light assemblies were identical except that one mounting plate was not treated and the other mounting plate was black-anodized. The temperature at the interface between the LEDs and the mounting plate was then monitored and plotted versus time. The results of the test for the assembly having the non-coated mounting plate and for the assembly having the black-treated mounting plate are shown in FIG. 12. As apparent from a comparison of the two plots, at thermal equilibrium (about 3600 seconds for these assemblies), the LEDs of the assembly having the black-treated mounting plate remain 6° to 12° C. cooler than the LEDs of the assembly having the untreated mounting plate. The extent of this difference in temperature was unexpected, and is very significant since AlInGaP LEDs typically exhibit a 1 percent increase in luminous flux for every 1° C. reduction in temperature at equilibrium. Although the LEDs tested use only one AlInGaP LED chip, the AlInGaP chip is used to emit amber light and constitutes about 65-85 percent of the white light mixture emitted from the LED device.

Reliability of electronic components (including discrete LED components) improves almost exponentially with operating temperature reduction. This is particularly true of LEDs in which the $T_g$ of the clear encapsulation/mold compounds used place relatively firm absolute limits on the maximum internal temperature allowed for each device (typically, 110-130° C. depending on the material). With automotive interior operating temperature specifications reaching 85° C., the temperature difference permissible for the LED optical material limit becomes even more critical.

Again, by providing an appropriate angle between lamp mounting portion 32 and mirror mounting portion 34 of mounting plate 30, the assembled lamp assembly 10 may thus be properly registered and mounted to mirror housing 50 with the bottom surface of reflector 20 properly aligned over an aperture 52 formed in the bottom of housing 50.

With reference to FIGS. 10 and 11, mirror mounting portion 34 of mounting plate 30 includes first and second apertures 35 for engaging mounting pegs 54 that extend forwardly of the inner rear wall of mirror housing 50 on opposite sides of a central aperture 55 provided in the center of the rear wall of housing 50. Central aperture 55 receives a center mounting post 62 of a double ball mount stem 64 of mirror mounting structure 60. A third aperture 37 is provided in mounting plate 30 in between first and second apertures 35 for also receiving a portion of post 62. A fourth aperture 39 is provided in mounting plate 30 for receipt of a rotation prevention post 66 that extends from an off-axis location on a mounting washer 68 at the end of mirror stem 64. Post 66 extends through an aperture 57 provided in the rear wall of mirror housing 50 and through aperture 39. Post 66 prevents rotation of the mirror housing with respect to the rear end of the first mounting ball. Rotation, however, is permitted by rotation of the ball within a sleeve of the mounting stem 64. As shown in FIG. 10, the mounting structure 60 further includes a mounting shoe 69 that is secured to the interior surface of a windshield. It will be appreciated, however, that mirror mounting structure 60 may have any form including a single ball structure or a structure that mounts to the roof of the vehicle rather than to the inside surface of the vehicle windshield.

One benefit of utilizing mounting plate 30 as a heat sink and extending the mounting plate to physically and thermally contact portions of washer 68 and mounting structure 60 is that most of mounting structure 60 is formed of thermally conductive material such that the mounting bracket 60 functions as an extension of a heat sink for the LEDs of the lamp assembly.

Although mounting plate 30 is shown as including a mirror mounting portion 34 that secures to the rear wall of mirror housing 50 at the location where the housing 50 is attached to the mounting structure 60, it will be appreciated by those skilled in the art that mounting plate 30 may be configured so as to secure the lamp assembly 10 to other portions within housing 50. Also, although the preferred construction utilizes a thermally conductive mounting plate 30 and a plastic reflector 20, it is possible to construct the lamp assembly with a thermally conductive reflector 20 and/or a non-thermally conductive mounting plate 30. In this case, reflector 20 would function as the heat sink either by itself or in combination with mounting plate 30.

Figure 3:
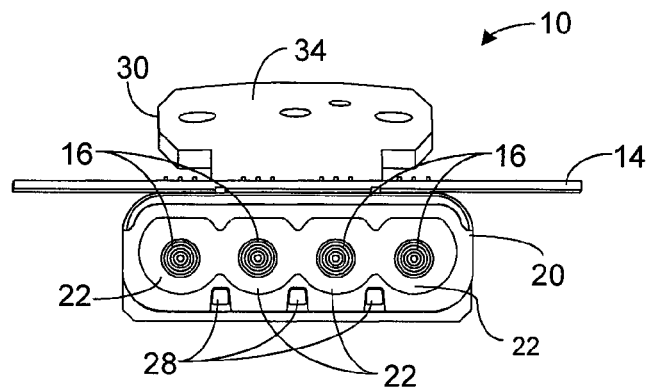
FIG. 3 is a plan view showing the bottom of the map lamp assembly of the first embodiment.

As shown in FIGS. 8-10, the lamp assembly further includes a lens 40. Lens 40 is preferably formed of a transparent plastic material and is configured to fit within aperture 52 formed in the bottom of mirror housing 50. For this purpose, lens 40 includes fingers 42 that catch an upper edge within aperture 52 and a plurality of resilient legs 44 on an opposite side for snapping into place within aperture 52. Lens 40 is preferably formed of a thickness to allow lens 40 to be mounted flush with the outer bottom surface of housing 50. Reflector 20 may be formed to have a plurality of recesses 28 (FIG. 3) corresponding in position and size to legs 44 of lens 40 to allow a flush mount of both lens 40 and reflector 20 with housing 50.

As best shown in FIGS. 8 and 9, lens 40 includes a first lens portion 46 and a second lens portion 48. First lens portion 46 includes an optical deviator for deviating the direction at which light is emitted from the bottom of the lamp assembly slightly towards the rear of the vehicle so as to be projected onto at least a portion of the driver's lap as well as a portion of any center console that may be present in the vehicle. Second lens portion 48 also includes an optical deviator, which is configured to redirect the light from its associated two LEDs slightly to the rear of the vehicle and to the right of the map light assembly onto the lap of the front passenger, if present. The deviators are preferably formed as a plurality of parallel angled facets in the inside surface of the lens such that the outside surface of the lens may be relatively smooth. Lens 40 may include a slightly roughened outside or inside surface so as to slightly diffuse the light emitted from the associated LEDs. It will be appreciated by those skilled in the art that mirror housing 50 may be formed of either an opaque material or may be formed of a partially transparent material such that lens 40 may be integrally formed within housing 50. Similar transparent mirror housings are disclosed in commonly assigned published U.S. Patent Application Publication No. 2002/0024713, the entire disclosure of which is incorporated herein by reference.

A rearview mirror assembly 100 constructed in accordance with the second embodiment of the present invention is shown in FIGS. 13-17. As shown, rearview mirror assembly 100 includes a mirror housing 150 supported on a mounting structure 102, which includes a mounting foot 105 and a mount housing 120. In this embodiment, a map/courtesy lamp assembly 110 is incorporated into mount housing 120. A single lens or a plurality of lenses 140 is provided to direct and/or diffuse the light from high-powered LEDs provided in the housing to locations in the vehicle cabin as specified by the manufacturer. By incorporating lamp assembly 110 into mount housing 120, rather than in housing 150, the lights can be provided in a fixed position so as to not be affected by the adjustment of mirror housing 150. Additionally, by providing the lamp assembly 110 in mount housing 120, the rearview mirror assembly may be used in markets for either left—or right-hand drive vehicles without requiring any modification to the rearview mirror assembly. It is also possible to construct mount housing 120 of a material that is transparent to the light emitted from the LEDs. It is also advantageous to have the mounting foot 105 be comprised of a thermally conductive material and be materially and thermally connected to the heat extractors 18 of LEDs 16.

FIGS. 18-23 show a map lamp assembly 212 constructed in accordance with a third embodiment of the present invention. Like the first embodiment, map lamp assembly 212 includes a printed circuit board 214 on which a plurality of high power LEDs 216 is mounted. The circuit board 214 and LEDs 216 are physically mounted to a reflector 220 by means of heat stake tabs 224 and 226 in a manner similar to that described above with respect to the first embodiment. Although not shown in FIGS. 18-23, a heat sink may also engage heat stake tabs 224 and 226 to provide additional heat sinking of high power LEDs 216. As will be described further below, the third embodiment differs from the first embodiment in that an additional transparent cover 250 and an additional LED 260 are provided in the assembly. LED 260 may be any conventional lower power LED and preferably is an LED that emits red light. LED 260 may thus be utilized to provide an indicator light for a security system in the vehicle in which the lamp assembly is mounted.

Figure 24:
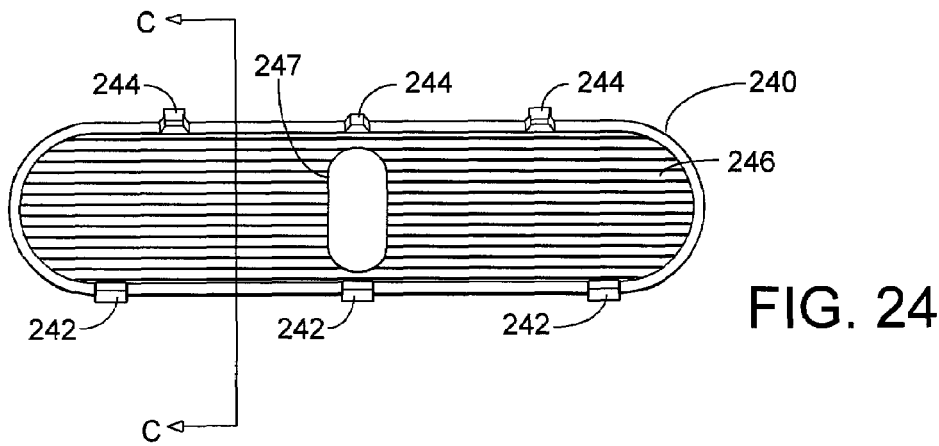
FIG. 24 is a plan view of the inside surface of a first lens used in the third embodiment.
Figure 25:
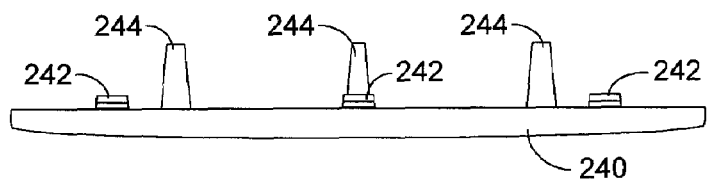
FIG. 25 is an elevational view of the front of the lens shown in FIG. 24.
Figure 26:
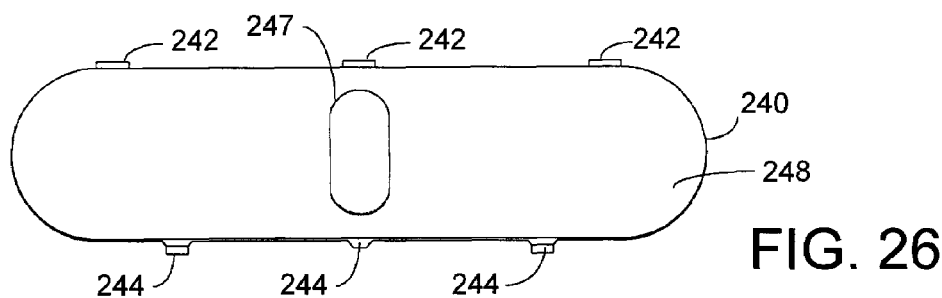
FIG. 26 is a plan view showing the outside surface of the lens shown in FIGS. 24 and 25.
Figure 27:
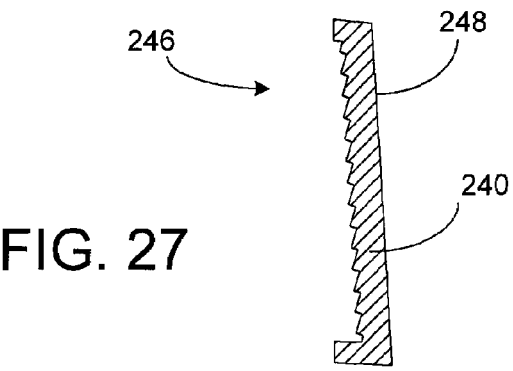
FIG. 27 is a cross section of the lens shown in FIG. 24 taken along line C-C.

As best shown in FIGS. 21-22, LED 260 is mounted so as to protrude further downward in the assembly than high power LEDs 216. Accordingly, an aperture 227 is provided in reflector 220 to allow LED 260 to protrude further downward. Additionally, an aperture 247 (see FIGS. 24 and 26) is provided in lens 240 to allow LED 260 to extend below the plane of lens 240 and protrude into the domed portion of cover 250. This allows the LED 260 to be visible 360° below the mirror housing. By flashing or otherwise illuminating LED 260 when a vehicle alarm system is armed, the 360° field of view under the rearview mirror provides greater visibility from the outside of the vehicle of the armed status of the vehicle alarm system thereby providing a greater deterrent effect.

Due to the addition of domed cover 250, the map lamp assembly 212 is further modified such that lens 240 is secured to reflector 220 rather than to the mirror housing. Domed cover 250 is thus configured to snap into place within the mirror housing. More specifically, as best shown in FIGS. 24-27, lens 240 includes an inside surface 246 having a plurality of microgrooves, an outside surface 248 that is substantially flat, and a plurality of resilient tabs 242 and 244 for engaging the bottom surface of reflector 220. A plurality of slots 228 as shown in FIGS. 28-33 for receiving resilient tabs 244 is provided along the bottom and back surface of reflector 220. Slots 228 are also provided to allow for room to accommodate resilient tabs 252 that are provided on domed cover 250, which otherwise engage the mirror housing. Additional slots in reflector 220 may be provided to allow for clearance of tabs 254 provided on the opposite side of domed cover 250.

Reflector 220 is illustrated in FIGS. 28-33. Like the reflector in the first embodiment, reflector 220 includes a plurality of reflective cups 222 for collimating or otherwise redirecting the light emitted from high power LEDs 216. Reflector 220 may include a lip 225 configured to mate with a peripheral edge of lens 240. Reflective cups 222 may be elliptical, parabolic, or a complex surface configured to create an elongated light pattern to run from the driver's lap to the passengers lap.

While the construction of the high power LEDs is typically two amber LED dice and one blue-green LED die to produce effective white light, it is conceivable to replace one of the amber dice with a red LED die. This would allow in the third embodiment above, which utilizes a fifth LED in the middle to serve as an indicator light, to be replaced. Allowing that three or four high power LEDs could be used with either only the center high power LED(s) or all three/four LEDs including a red LED chip that may be selectively and independently activated relative to the other LEDs that are activated to produce white light for map lamp illumination purposes. In this regard, some modification of the optics may be desired to allow for redirection of some portion of the light emitted from the middle LED having the red LED chip so as to ensure that the red LED light is visible as may be required for any particular application.

In the preferred implementation of the map lamp assembly constructed in accordance with the above embodiments, the preferred high power LEDs would each include two amber LED chips and one blue-green LED chip whose light when combined forms effective white light illumination. By configuring one or each of these high power LEDs such that the amber LED chips may be independently activated relative to the blue-green LED chip, the map lamp assemblies would be capable of providing contour lighting by activating only the amber LEDs and perhaps activating them at a lower power. The intensity of the LEDs may be gradually varied for fade-on and fade-off type lighting and for providing a relatively dim contour lighting. Such control of the LED illumination may be provided by utilizing a pulse-width modulated signal sent from a microcontroller. The microcontroller may be programmed to operate and control the relative intensities of the operation of the LEDs in response to activation of manual switches on the mirror housing or elsewhere in the vehicle or upon command from another electronic module in the vehicle via either discrete wiring, the vehicle bus, or a wireless link. Alternatively, the contour lighting could be provided whenever there is power provided from the vehicle ignition or at virtually all times given the relatively low power consumption of operating either one or a plurality of such LEDs.

As described above, the first type LEDs, which provide bright illumination, are preferably constructed as disclosed in U.S. Pat. No. 6,335,548, they may alternatively be constructed as described in published U.S. Patent Application Publication No. 2001/0026011, U.S. patent application Ser. No. 09/723,675, now abandoned, or U.S. Pat. No. 6,639,360, the entire disclosures of which are incorporated herein by reference. The second type LED, which provides either contour lighting and/or a security system indicator light, may be of any conventional construction and need not be a high power LED. The brightness and efficiency of the second type LED may nevertheless be improved by making the LED in accordance with the teachings of U.S. patent application Ser. No. 09/723,675, now abandoned.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. An interior rearview mirror assembly for a vehicle comprising:
   a mirror mounting structure for attaching to the vehicle;
   a mirror housing;
   a mirror supported by said mirror mounting structure and mounted in said mirror housing; and
   a light subassembly supported by said mirror mounting structure within said mirror housing, said light subassembly comprising:
      at least one LED device; and
      a thermally conductive mounting plate disposed in thermal communication with said at least one LED device, wherein said mounting plate is in direct contact with said mirror mounting structure.

2. The interior rearview mirror assembly of claim 1, wherein said mounting plate comprises a post and said mounting structure comprises an aperture for receiving said post to mount said mounting plate to said mirror mounting structure.

3. The interior rearview mirror assembly of claim 1, wherein said mirror mounting structure comprises a post and said mounting plate comprises at least one aperture for receiving said post.

4. The interior rearview mirror assembly of claim 1, wherein said mirror mounting structure comprises a plurality of posts and said mounting plate comprises a plurality of apertures corresponding to said posts for receiving said posts.

5. The interior rearview mirror assembly of claim 1, wherein said at least one LED device comprises at least one LED chip and a heat extraction element in thermal communication with said at least one LED chip; and wherein said light subassembly further comprises a thermally conductive reflector for reflecting light emitted by said at least one LED device, said thermally conductive reflector being disposed in thermal communication with said heat extraction element so as to function as a heat sink for said at least one LED chip.

6. An interior rearview mirror assembly for a vehicle comprising:
   a mirror mounting structure having a mounting shoe for attaching to the vehicle and having a mounting washer at an end opposite said mounting shoe;
   a mirror housing;
   a mirror supported by said mirror mounting structure and mounted in said mirror housing; and
   a light subassembly supported by said mirror mounting structure within said mirror housing, said light subassembly comprising:
      a plurality of LED devices mounted to a circuit board; and
      a thermally conductive mounting plate disposed in thermal communication with said at least one LED device, wherein said mounting plate being in direct contact with said mounting washer.

7. The interior rearview mirror assembly of claim 6, wherein said mounting plate comprises a post and said mounting washer comprises an aperture for receiving said post to mount said mounting plate to said mirror mounting structure.

8. The interior rearview mirror assembly of claim 6, wherein said mirror mounting washer comprises a post and said mounting plate comprises at least one aperture for receiving said post.

9. The interior rearview mirror assembly of claim 6, wherein said mirror mounting washer comprises a plurality of posts and said mounting plate comprises a plurality of apertures corresponding to said posts for receiving said posts.

10. The interior rearview mirror assembly of claim 6 and further comprising a reflector for reflecting light emitted by said at least one LED device, said thermally conductive reflector being disposed in thermal communication said at least one LED device.

11. The interior rearview mirror assembly of claim 6, wherein said at least one LED device comprises at least one LED chip and a heat extraction element in thermal communication with said at least one LED chip; and wherein said light subassembly further comprises a thermally conductive reflector for reflecting light emitted by said at least one LED device, said thermally conductive reflector being disposed in thermal communication with said heat extraction element so as to function as a heat sink for said at least one LED chip.

* * * * *